(12) United States Patent
Park et al.

(10) Patent No.: US 9,301,254 B2
(45) Date of Patent: *Mar. 29, 2016

(54) METHOD AND DEVICE FOR OPERATING IN IDLE MODE

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 645 days.

This patent is subject to a terminal disclaimer.

(21) Appl. No.: 13/569,973

(22) Filed: Aug. 8, 2012

(65) Prior Publication Data

US 2013/0039243 A1  Feb. 14, 2013

Related U.S. Application Data

(60) Provisional application No. 61/522,690, filed on Aug. 12, 2011, provisional application No. 61/525,190, filed on Aug. 19, 2011.

(51) Int. Cl.
| | |
|---|---|
| *H04W 52/02* | (2009.01) |
| *H04W 68/00* | (2009.01) |
| *H04W 72/04* | (2009.01) |
| *H04W 68/02* | (2009.01) |
| *H04W 4/00* | (2009.01) |

(52) U.S. Cl.
CPC .......... *H04W 52/0216* (2013.01); *H04W 68/02* (2013.01); *H04W 4/005* (2013.01); *H04W 72/042* (2013.01)

(58) Field of Classification Search
CPC .......... H04W 52/0216; H04W 72/042; H04W 68/02; H04W 4/005
USPC .......................................................... 370/311
See application file for complete search history.

(56) References Cited

U.S. PATENT DOCUMENTS

| | | | |
|---|---|---|---|
| 8,929,267 B2 * | 1/2015 | Park et al. ...................... 370/311 |
| 2009/0170534 A1 * | 7/2009 | Ryu et al. ........................ 455/458 |
| 2009/0227265 A1 * | 9/2009 | Kang et al. ................... 455/456.1 |
| 2009/0280812 A1 * | 11/2009 | Cheng et al. .................... 455/436 |
| 2010/0041399 A1 * | 2/2010 | Kim et al. ....................... 455/434 |

(Continued)

OTHER PUBLICATIONS

Honggang Li et al., "Optimized schemes of network re-entry for M2M in 16m", IEEE 802.16 Broadband Wireless Access Working Group, May 8, 2011.*

(Continued)

*Primary Examiner* — Jung Park
*Assistant Examiner* — Albert Shih
(74) *Attorney, Agent, or Firm* — Dentons US LLP

(57) ABSTRACT

A method and device for operating in an idle mode for Machine To Machine (M2M) communication are provided. A M2M device receives a paging message from a base station. The paging message includes a M2M group identifier that identifies a M2M group to which the M2M device belongs. The M2M device monitors an uplink resource allocation beginning from an offset during a monitoring duration.

10 Claims, 7 Drawing Sheets

(56) References Cited

U.S. PATENT DOCUMENTS

| | | | |
|---|---|---|---|
| 2010/0246490 A1* | 9/2010 | Lavi et al. | 370/328 |
| 2012/0051300 A1* | 3/2012 | Cho et al. | 370/329 |
| 2013/0005342 A1* | 1/2013 | Cho et al. | 455/438 |
| 2013/0051295 A1* | 2/2013 | Park et al. | 370/311 |
| 2013/0051296 A1* | 2/2013 | Park et al. | 370/311 |
| 2013/0250831 A1* | 9/2013 | Park et al. | 370/311 |
| 2014/0141827 A1* | 5/2014 | Park et al. | 455/515 |
| 2014/0148199 A1* | 5/2014 | Park et al. | 455/456.2 |

OTHER PUBLICATIONS

IEEE P802.16p AWD: "Enhancements to support Machine-to-Machine Applications", IEEE 802.16p-10/0018r2 IEEE, May 25, 2011, pp. 1-27, XP002690765.*

Honggang Li et al., "Idle mode optimizations for fixed M2M devices", IEEE 802.16p-11/0202r2, Jul. 20, 2011, pp. 1-9, XP002690764.*

* cited by examiner

METHOD AND DEVICE FOR OPERATING IN IDLE MODE

CROSS-REFERENCE TO RELATED APPLICATIONS

This application claims the benefit of priority of U.S. Provisional applications 61/522,690 filed on Aug. 12, 2011, and 61/525,190 filed on Aug. 19, 2011, all of which are incorporated by reference in their entirety herein.

BACKGROUND OF THE INVENTION

1. Field of the Invention

The present invention relates to wireless communications, and more particularly, to method and device for operating in an idle mode for Machine To Machine (M2M) communication.

2. Related Art

Machine To Machine (M2M) communication is one type of data communication including one or more entities not requiring human interactions. M2M communication may also be called as Machine Type Communication (MTC) That is, the M2M communication refers to the concept of communication based on the existing wireless communication network used by a machine device instead of a user equipment operated by a human. The machine device used in the M2M communication can be called a M2M device. There are various M2M devices such as a vending machine, a machine of measuring a water level at a dam, etc.

The M2M device has a feature different from that of a typical user equipment. Therefore, a service optimized to the M2M communication may differ from a service optimized to human-to-human communication. In comparison with a current mobile network communication service, the M2M communication can be characterized as a different market scenario, data communication, less costs and efforts, a potentially great number of M2M devices, wide service areas, low traffic for each M2M device, etc.

An idle mode is a mode in which the user equipment wakes up only during a specific duration to transmit or receive data in order to save battery consumption. A network re-entry process is a process in which the user equipment in the idle mode is recovered to a connected state with respect to a network.

It is required to consider the M2M communication feature in the operation of the M2M device in the idle mode.

SUMMARY OF THE INVENTION

The present invention provides a method and device for operating in an idle mode for Machine To Machine (M2M) communication.

In an aspect, a method for operating in an idle mode for Machine To Machine (M2M) communication is provided. The method entering, by a M2M device, into an idle mode, receiving, by the M2M device in the idle mode, a paging message from a base station, the paging message includes a M2M group identifier, a network access type, a resource offset and a monitoring duration, the M2M group identifier that identifies a M2M group to which the M2M device belongs, the network access type indicating a resource allocation for a ranging request, the resource offset indicating an offset that the M2M device starts to monitor an uplink resource assignment, the monitoring duration indicating a time duration that the M2M device monitors the uplink resource assignment; and monitoring, by the M2M device, the uplink resource allocation beginning from the offset during the monitoring duration.

The method may further includes transmitting, by the M2M device, the ranging request to the base station by using the uplink resource assignment when the M2M device succeeds to receive the uplink resource assignment before an expiration of the monitoring duration.

The method may further includes transmitting, by the M2M device, a ranging code to the base station when the M2M device fails to receive the uplink resource assignment until an expiration of the time duration.

A cyclic redundancy check (CRC) of the uplink resource assignment may be masked with a part of a M2M identifier that identifies the M2M device.

In another aspect, a wireless device configured for operating in an idle mode for Machine To Machine (M2M) communication is provided. The wireless device includes a radio frequency unit for receiving and transmitting a radio signal, and a processor operatively coupled with the radio frequency unit and configured to enter into an idle mode, receive, at the idle mode, a paging message from a base station, the paging message includes a M2M group identifier, a network access type, a resource offset and a monitoring duration, the M2M group identifier that identifies a M2M group to which the wireless device belongs, the network access type indicating a resource allocation for a ranging request, the resource offset indicating an offset that the wireless device starts to monitor an uplink resource assignment, the monitoring duration indicating a time duration that the wireless device monitors the uplink resource assignment, and monitor the uplink resource allocation beginning from the offset during the monitoring duration.

DESCRIPTION OF EXEMPLARY EMBODIMENTS

Figure 1:
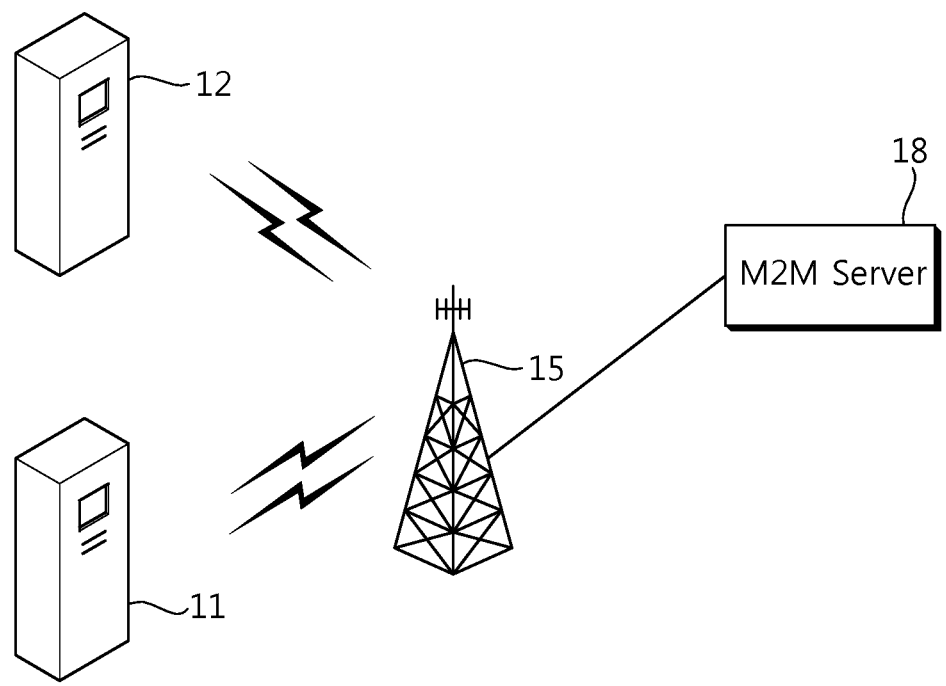
FIG. 1 shows an example of M2M (Machine To Machine) communication.

FIG. 1 shows an example of M2M (Machine To Machine) communication.

The M2M communication is also called a Machine Type Communication (MTC), and refers to information exchange between M2M devices 11 and 12 via a Base Station (BS) 15 without human interactions and information exchange between the M2M device 11 and a M2M server 18 via the BS.

The M2M server 18 is an entity for communicating with the M2M device 11. The M2M server 18 executes a M2M application, and provides a M2M-specific service to the M2M device 11.

The M2M device 11 is a wireless device for providing the M2M communication, and may be fixed or mobile. The M2M device is also called a MTC device.

A service provided using the M2M communication may be differentiated from the existing communication service requiring human intervention, and its service range is various, such as tracking, metering, payment, medical field services, remote controlling, etc.

Representative examples of individual service requirements of M2M features may be as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device can delay data delivery. If a network load is greater than a pre-determined load threshold, a network operator can restrict network access of the M2M device or data transmission to another MTC device, and can dynamically restrict an amount of data that can be delivered by the MTC device in a specific region.

3) Offline indication feature: This is a case in which a notification is requested to the M2M device at a proper time when signaling is no longer possible between the M2M device and the network.

4) PAM (Priority Alarm Message) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing user equipment identifiers, and thus the following identifier is taken into account.

Station identifier (STID): The STID is used to identify the M2M devices in the domain of the BS. The BS may assign the same STID to multiple M2M devices.

M2M Group Identifier (MGID): The MGID is a 12-bit value that uniquely identifies a downlink multicast service flow shared by a group of M2M devices within an M2M Group Zone. The M2M Group Zone is a logical zone comprising one or more BSs. An M2M Group Zone is identified by a M2M GROUP ZONE ID. The MGID may be assigned during dynamic service addition (DSA) procedure. The assigned MGID may be retained by the M2M device even in idle state unless the M2M device exits from the network or the network explicitly deletes the service flow associated with the MGID.

Fixed M2M Deregistration ID (FMDID): The FMDID is a 16-bit value that uniquely identifies a M2M device in domain of the BS. The FMDID is assigned to the M2M device by the BS during idle mode entry and released during the network reentry.

Deregistration identifier (DID): The DID is a 18-bit value used to identify a device in an idle mode within the set of paging group ID, paging cycle and paging offset. The network may assign the DID to each device during idle mode initiation.

Now, the idle mode operation in an IEEE 802.16m-based system will be described with reference to IEEE (Institute of Electrical and Electronics Engineers) P802.16 m/D10 "Part 16: Air Interface for Broadband Wireless Access Systems: Advanced Air Interface" released at Nov. 24, 2010. However, a wireless communication system to which the present invention is applied is not limited to the IEEE 802.16m-based system. Thus, the present invention is also applicable to various wireless communication systems such as 3GPP (3rd Generation Partnership Project) LTE (Long Term Evolution), etc.

Figure 2:
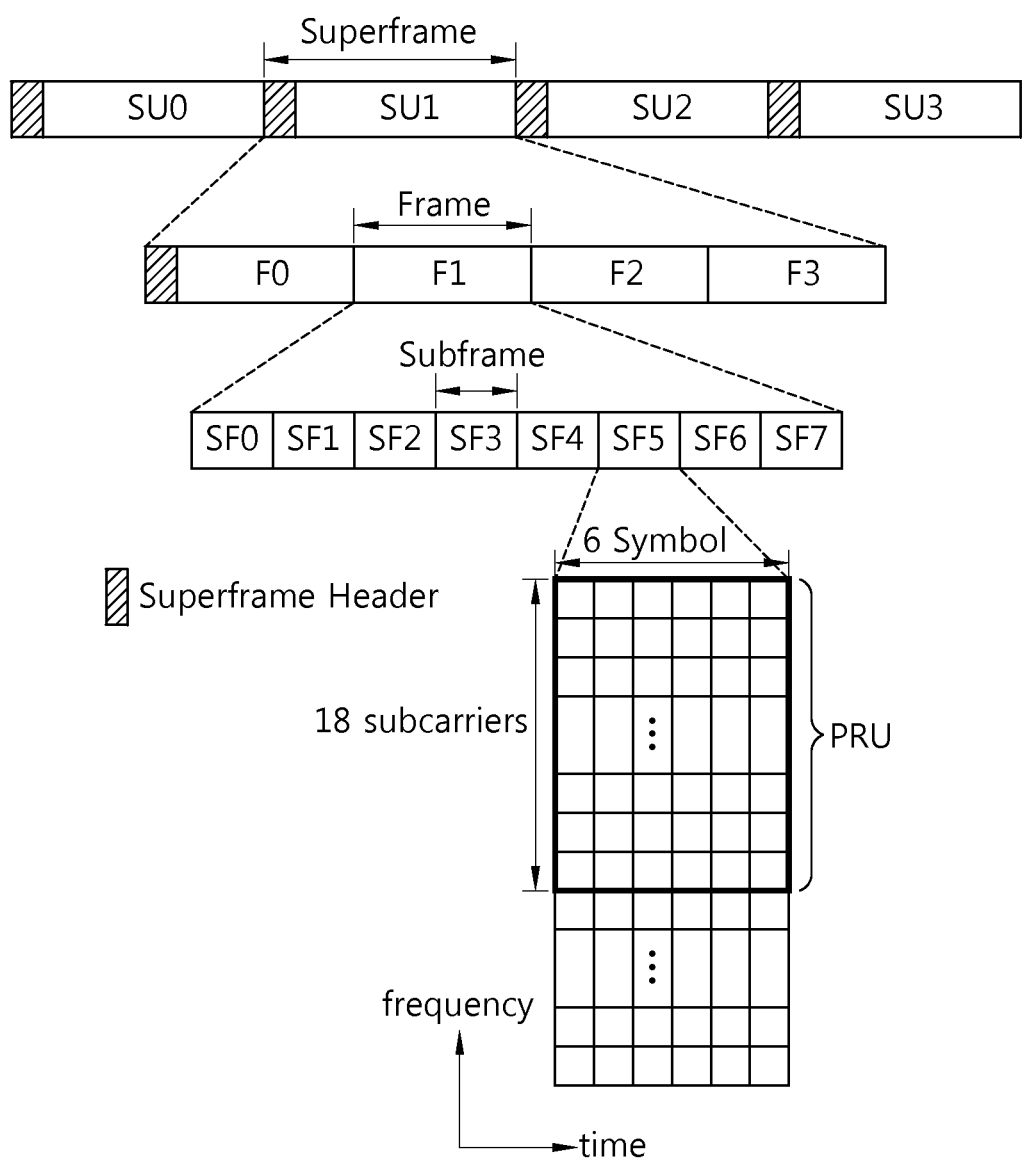
FIG. 2 shows an exemplary frame structure of an IEEE 802.16m system.

FIG. 2 shows an exemplary frame structure of an IEEE 802.16m system.

A Superframe (SF) includes a Superframe Header (SFH) and four frames F0, F1, F2, and F3. Each frame may have the same length in the SF. A size of the SF is 20 ms, and a size of each frame is 5 ms.

The frame includes a plurality of subframes SF0, SF1, SF2, SF3, SF4, SF5, SF6, and SF7. The subframe can be used for uplink transmission or downlink transmission. The subframe includes a plurality of Orthogonal Frequency Division Multiplexing (OFDM) symbols in a time domain. The OFDM symbol is for expressing one symbol period, and there is no limitation in a multiple access scheme or terminologies The subframe includes 6 OFDM symbols. This is for exemplary purposes only. The subframe may include 5, 7, or 9 OFDM symbols, and the present invention is not limited thereto.

A subframe type can be defined according to the number of OFDM symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols.

A Time Division Duplex (TDD) scheme or a Frequency Division Duplex (FDD) scheme can be applied to the frame. Subframes included in a TDD frame can be divided into uplink subframes and downlink subframes.

The size of the SF, the number of frames included in the SF, the number of subframes included in the frame, and the number of OFDM symbols included in the subframe may change, and the present invention is not limited thereto.

The SFH can carry an essential system parameter and system configuration information. The SFH can be transmitted in the last 5 OFDM symbols of the first subframe included in the SF.

A Physical Resource Unit (PRU) is a basic resource assignment unit, and includes 18 subcarriers in consecutive OFDM symbols in the same subframe.

In conventional IEEE 802.16 system, an Advanced-MAP (A-MAP) carries service control information. A non-user specific A-MAP carries information which is not limited to a specific user or a specific user group. A Hybrid Automatic Repeat Request (HARQ) Feedback A-MAP carries HARQ ACK/NACK information regarding uplink data transmission. A Power Control A-MAP carries a power control command for a mobile station (MS).

An Assignment A-MAP carries resource assignment information. The Assignment A-MAP includes several types of A-MAPs, such as a Downlink (DL) Basic Assignment A-MAP, a Uplink (UL) Basic Assignment A-MAP, a Code Division Multiple Access (CDMA) Allocation A-MAP, etc. The CDMA Allocation A-MAP includes a UL resource assignment based on a band request or a UL resource assignment based on a ranging request.

All A-MAPs share a physical resource region called an A-MAP region. The A-MAP region exists in each DL subframe.

Figure 3:
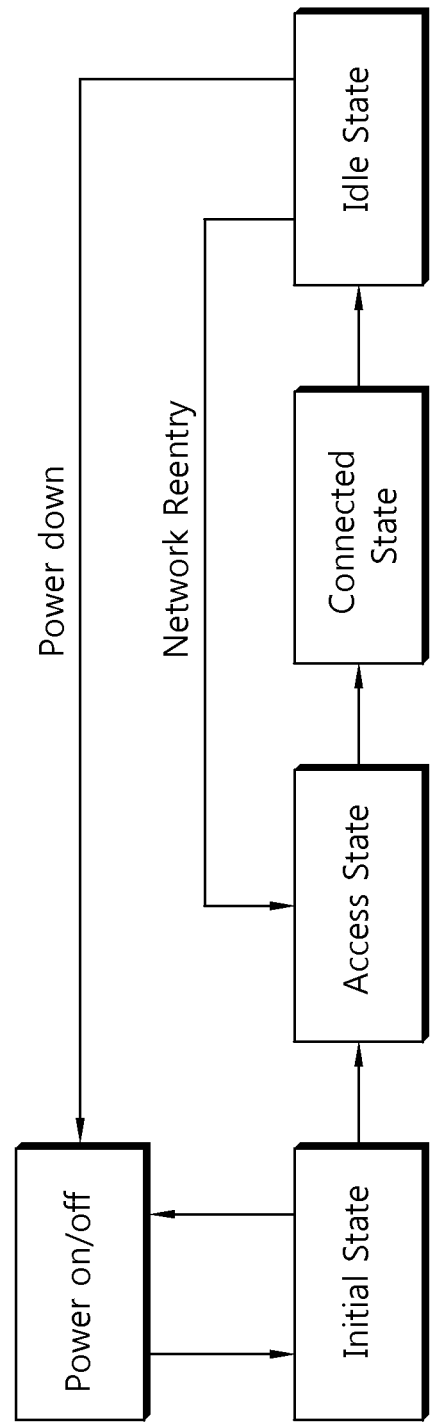
FIG. 3 shows an operation transition diagram in IEEE 802.16m.

FIG. 3 shows an operation transition diagram in IEEE 802.16m.

In an initialization state, a mobile station (MS) performs cell selection by receiving synchronization and system configuration.

In an access state, the MS performs a network entry. The network entry is a process including ranging, basic capability negotiation, and authentication with respect to a BS.

In a connected state, the MS operates in any one of a sleep mode, an active mode, and a scanning mode. During the connected state, the MS maintains a connection established during the connected state. The MS in the active mode can always transmit or receive scheduled data. In the sleep mode, a radio frame is divided into a sleep window and a listening window. The MS in the sleep mode can receive data from the BS during the listening window. The MS in the scanning mode performs measurement instructed by the BS.

In the idle state, the MS operates in the idle mode. The idle mode includes a paging available interval and a paging unavailable interval. The BS does not transmit any DL traffic (e.g., a paging message, etc.) in the paging unavailable interval.

Figure 4:
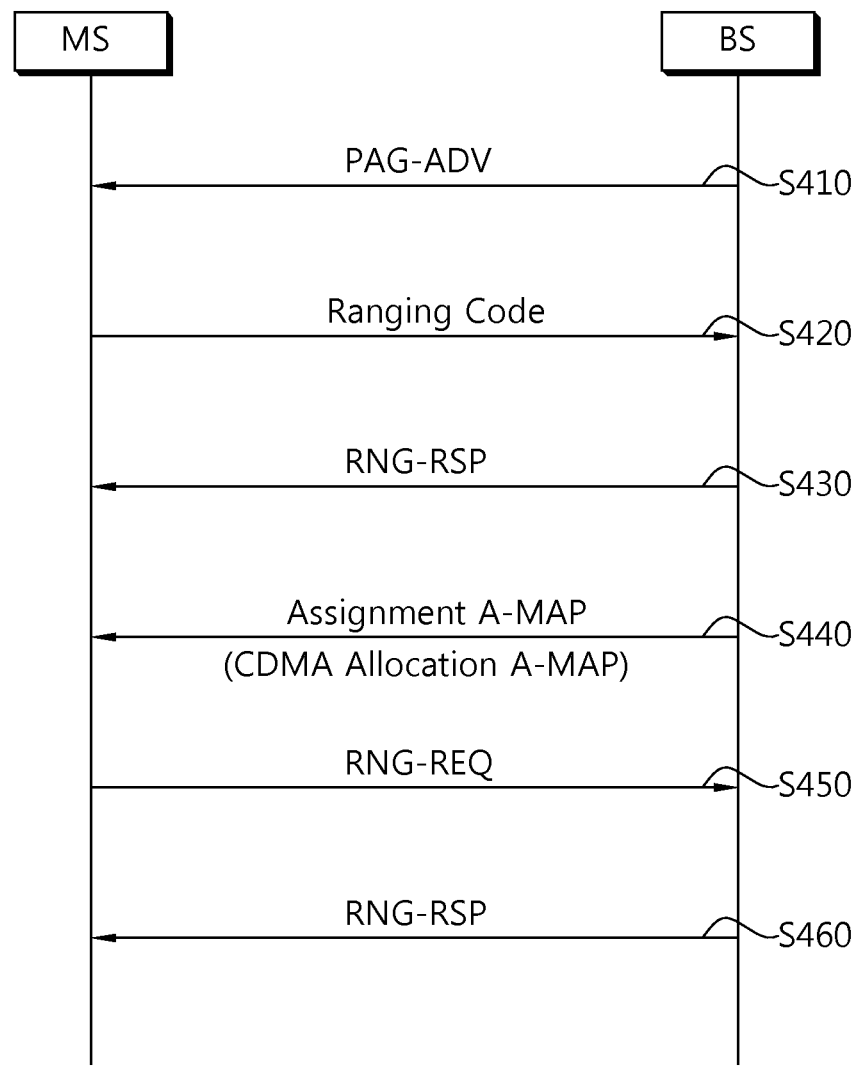
FIG. 4 is a flowchart showing an operation in an idle mode in IEEE 802.16m.

FIG. 4 is a flowchart showing an operation in an idle mode in IEEE 802.16m.

In step S410, in the idle mode, an MS monitors reception of a paging message during a paging available interval, and thus receives a Paging Advertisement (PAG-ADV) message. The PAG-ADV message is a paging massage at IEEE 802.16 and is a notification message for indicating whether there is pending DL traffic to a specific MS. The PAG-ADV message may be one example of a paging message for attempting paging to a M2M device in the idle mode.

By using the PAG-ADV message, a BS can instruct each MS to perform ranging for a network reentry or a location update.

In step S420, when the PAG-ADV message requests the network reentry, the MS ends the idle mode, and transmits a ranging code to the BS.

In step S430, in response to the ranging code, the MS receives a RNG-RSP (Ranging-Response) message from the BS. The RNG-RSP message includes a status code. The status code indicates one of 'continue', 'success', and 'abort'.

If the received RNG-RSP message has the status code of 'continue', the MS retransmits the ranging code.

If the status code is 'success', in step S440, the MS receives an Assignment A-MAP (Advanced-MAP). The Assignment A-MAP includes a CDMA Allocation A-MAP.

The A-MAP is one example of control information for communication between the BS and the MS in the IEEE 802.16-based system. The A-MAP can be called variously, for example, control information, control channels, resource assignment information, etc., according to a wireless communication system.

In step S450, by using a UL resource assignment indicated by the CDMA Allocation A-MAP, the MS transmits a RNG-REQ (Ranging-Request) message to the BS.

In step S460, the MS receives a RNG-RSP message in response to the RNG-REQ message.

In the idle mode, the MS first transmits the ranging code for the network re-entry. The ranging code is randomly selected by the MS from a plurality of code sets, and this is called contention based ranging.

Since the MS is mobile in a normal mobile communication system, there is no guarantee that UL synchronization is contiguously maintained between the BS and the MS in the idle mode. Therefore, when the MS receives paging in the idle mode, the MS performs UL synchronization by first performing ranging for the network re-entry.

However, in M2M communication, a M2M device scarcely moves. Alternatively, the M2M device having the time controlled feature does not require additional UL synchronization since UL synchronization is continuously maintained.

Therefore, there is a need for an idle mode operation considering the feature of M2M communication.

Figure 5:
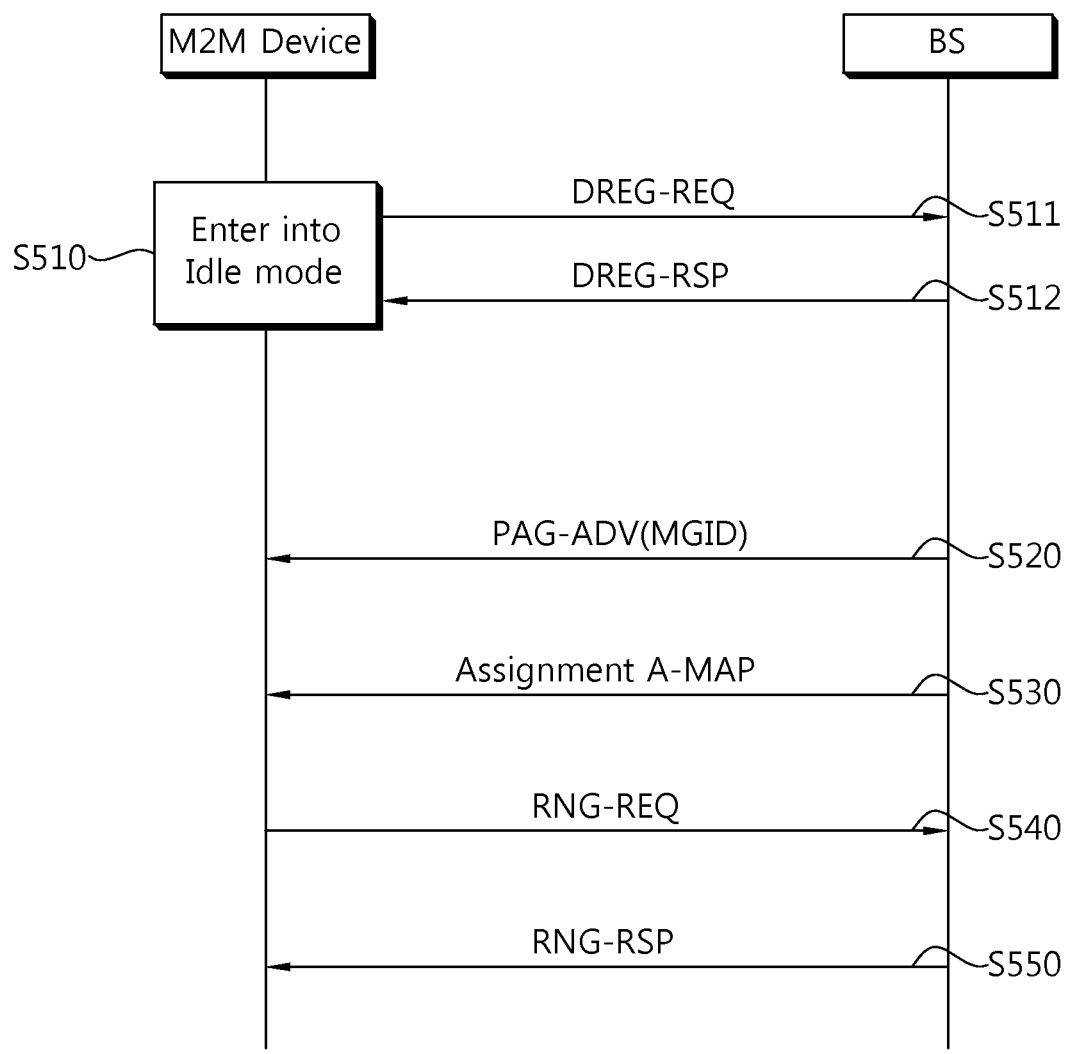
FIG. 5 shows an operation in an idle mode according to an embodiment of the present invention.

FIG. 5 shows an operation in an idle mode according to an embodiment of the present invention.

In step S510, a M2M device enters into the idle mode. The entering into the idle mode can be performed at a request of the M2M device or at a command from a BS.

In order for the M2M device to enter into the idle mode, in step S511, the M2M device may send to the BS a DREG-REG (Deregistration-Request) message for requesting the entering into the idle mode. In step S512, the M2M device may receive from the BS a DREG-RSP (Deregistration-Response) message for instructing the start of the idle mode.

Alternatively, the BS may transmit a DREG-CMD (Deregistration-Command) message to allow the M2M device to enter into the idle mode.

The DREG-RSP message or the DREG-CMD message may include FMDID of the M2M device.

In step S520, in the idle mode, the M2M device monitors reception of a paging message during a paging available interval and thus receives a PAG-ADV message. The PAG-ADV message may include MGID as a group paging message.

Table 1 below shows an exemplary format of the proposed PAG-ADV message.

TABLE 1

| Field | Size (bits) | Description |
|---|---|---|
| MGID | 12 | M2M Group ID |
| M2M Group Zone Index | 2 | A zone Index corresponding to an M2M GROUP ZONE ID. Present if a BS is part of more than one M2M Group Zone. |
| Action Code | 2 | 0b00: Performing network reentry<br>0b01: Performing location update |
| If (Action Code == 0b00 or 0b01) { | | |
| network access type | 2 | Indicate the network access scheme for M2M device<br>0b00: Resource allocation for RNG-REQ.<br>0b01: dedicated ranging channel allocation<br>0b10: dedicated ranging channel allocation<br>0b11: No dedicated ranging channel |
| If (network access type == 0b00) { | | |
| Resource offset | | This parameter may indicate the offset in units of frames that M2M device starts to monitor the resource allocation (i.e., Assignment A-MAP) for the ranging request, where the reference point of this offset value may be the frame in which the PAG-ADV is transmitted. |

TABLE 1-continued

| Field | Size (bits) | Description |
|---|---|---|
| Monitoring duration | | This parameter may indicate time duration that M2M device monitors the resource allocation (i.e., Assignment A-MAP) for ranging request. |
| } } // End of if (Action Code == 0b00 or 0b01) | | |

When the M2M device receives the group paging message (i.e., PAG-ADV with MGID and/or M2M Group Zone Index) and a network access type is set to 0b00 (i.e., Resource allocation for RNG-REQ), it starts to monitor an Assignment A-MAP to obtain the uplink resource allocation for RNG-REQ message at a resource offset during the monitoring duration. If the M2M device fails to decode the Assignment A-MAP until the expiration of the monitoring duration, the M2M device may perform contention-based ranging.

The monitoring duration may indicate a value of a monitoring timer. The monitoring timer starts when the M2M device starts monitoring of the Assignment A-MAP. If the Assignment A-MAP is not received until the monitoring timer expires, the M2M device may transmit a ranging code to the BS in order to perform contention-based ranging.

In step S530, the M2M device receives the Assignment A-MAP by performing monitoring beginning from a resource offset during a monitoring duration. "Reception of the Assignment A-MAP" may imply successful decoding of the Assignment A-MAP.

The Assignment A-MAP includes a UL resource assignment for transmission of a RNG-REQ message. The Assignment A-MAP for RNG-REQ may include the existing CDMA Allocation A-MAP or a Ranging Assignment A-MAP for the M2M device.

Table 2 below shows an exemplary format of the proposed Ranging Assignment A-MAP.

TABLE 2

| Field | Size (bits) | Description |
|---|---|---|
| Part of M2M ID | | a part of M2M ID (i.e. MSB(most significant bit) 4 bits of FMDID or MSB 6 bits of DID) |
| Uplink/ Downlink Indicator | 1 | Indicates whether the following fields are for resource assignment in the uplink or in the downlink. 0b0: Uplink 0b1: Downlink |
| Resource Assignment | | Resource assignment may indicate location and allocation size. |

The Ranging Assignment A-MAP may have a 16-bit CRC (Cyclic Redundancy Check). The M2M device with FMDID may apply the 16-bit CRC mask with masking prefix=0b0, message type indicator=0b011, and masking code=LSB 12 bits of FMDID to decode the Assignment A-MAP. The MSB 4 bits of FMDID may be included in the Assignment A-MAP. The M2M device with DID may apply the 16-bit CRC mask with masking prefix=0b0, message type indicator=0b011, and masking code=LSB 12 bits of DID to decode the Assignment A-MAP IE. The MSB 6 bits of DID may be included in the Assignment A-MAP.

In step S540, the M2M device transmits the RNG-REQ message to the BS by using the UL resource assignment included in the Assignment A-MAP. If the Assignment A-MAP is not received, the M2M device may transmit a ranging code to the BS.

In step S550, the M2M device receives a RNG-RSP message in response to the RNG-REQ message.

Figure 6:
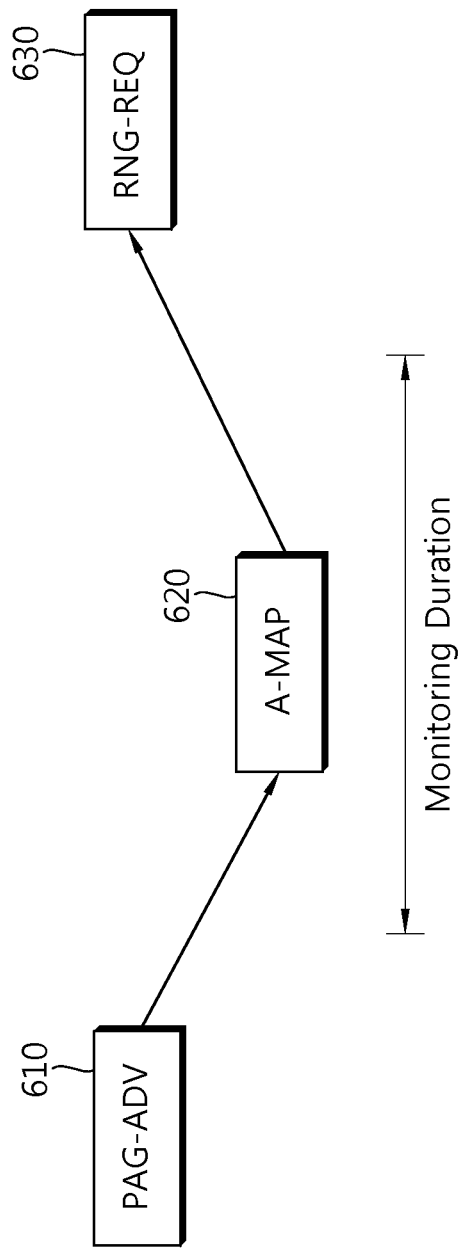
FIG. 6 shows an example of resource assignment of RNG-REQ using the proposed paging message.

FIG. 6 shows an example of resource assignment of RNG-REQ using the proposed paging message.

A M2M device receives a PAG-ADV message 610. The PAG-ADV message 610 may include a resource offset and a monitoring duration.

The M2M device monitors an Assignment A-MAP 620 having UL resource assignment during the monitoring duration on the basis of the resource offset. For example, if the M2M device has FMD1D, the M2M device decodes the Assignment A-MAP by using LSB 12 bits of the FMDID. If a decoding error is not detected, the M2M device can confirm that corresponding Assignment A-MAP is an Assignment A-MAP 620 for the M2M device.

The M2M device transmits a RNG-REQ message 630 by using the UL resource assignment included in the Assignment A-MAP 620.

If a group paging message is received and a network access type is set to a dedicated resource assignment for a ranging request, a plurality of M2M devices belonging to a M2M group starts monitoring of the Assignment A-MAP. However, if there is no specified time until which monitoring is continuously performed by the plurality of M2M devices, some M2M devices perform the monitoring for a significantly long period of time in order to find their Assignment A-MAPs, which may result in the increase in battery consumption of the M2M devices.

According to the proposed invention, a time duration in which the plurality of M2M devices perform the monitoring of the Assignment A-MAP is configured in a group paging process. Therefore, the M2M devices can be prevented from unexpectedly stopping the monitoring or from continuously performing the monitoring for a long period of time.

In the above table, a field name, a size, and a field value are for exemplary purposes only, and thus can be easily modified to other names and other values by those ordinarily skilled in the art. Not all of the fields proposed in the table are essential, and thus a specific field can be omitted.

Figure 7:
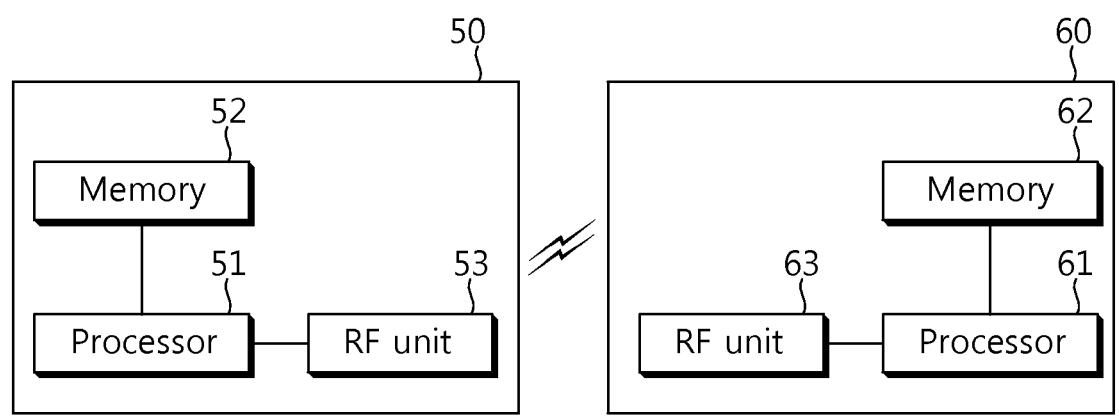
FIG. 7 is a block diagram showing a wireless communication system to implement an embodiment of the present invention.

FIG. 7 is a block diagram showing a wireless communication system to implement an embodiment of the present invention.

A M2M device 50 includes a processor 51, memory 52, and a radio frequency (RF) unit 53. The memory 52 is connected to the processor 51 and configured to store various information used for the operations for the processor 51. The RF unit 53 is connected to the processor 51 and configured to send and/or receive a radio signal. The processor 51 implements the proposed functions, processed, and/or methods. In the described embodiments, the operation of the M2M device may be implemented by the processor 51.

A BS 60 includes a processor 61, memory 62, and an RF unit 63. The memory 62 is connected to the processor 61 and configured to store various information used for the operations for the processor 61. The RF unit 63 is connected to the processor 61 and configured to send and/or receive a radio signal. The processor 61 implements the proposed functions, processed, and/or methods. In the described embodiments, the operation of the BS may be implemented by the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for operating in an idle mode for Machine To Machine (M2M) communication, comprising:
    entering, by a M2M device, into an idle mode;
    receiving, by the M2M device in the idle mode, a paging message from a base station, the paging message includes a M2M group identifier, a network access type, a resource offset and a monitoring duration,
        the M2M group identifier that identifies a M2M group to which the M2M device belongs,
        the network access type indicating a resource allocation for a ranging request,
        the resource offset indicating an offset that the M2M device starts to monitor an uplink resource assignment,
        the monitoring duration indicating a time duration that the M2M device monitors the uplink resource assignment; and
    monitoring, by the M2M device, the uplink resource allocation beginning from the offset during the monitoring duration,
    wherein a cyclic redundancy check (CRC) of the uplink resource assignment is masked with the 12 least significant bits of a fixed M2M deregristation identifier (FM-DID) to decode the uplink resource assignment, and
    wherein the 4 most significant bits of the FMDID are included in the uplink resource assignment.

2. The method of claim 1, further comprising:
    transmitting, by the M2M device, the ranging request to the base station by using the uplink resource assignment when the M2M device succeeds to receive the uplink resource assignment before an expiration of the monitoring duration.

3. The method of claim 1, further comprising:
    transmitting, by the M2M device, a ranging code to the base station when the M2M device fails to receive the uplink resource assignment until an expiration of the time duration.

4. The method of claim 1, wherein the paging message further includes an action code indicating that the M2M device performs a network reentry or a location update.

5. The method of claim 1, wherein the FMDID is a 16-bit identifier that uniquely identifies the M2M device in domain of the base station, and wherein the FMDID is assigned to the M2M device by the base station during an idle mode entry and is released during a network reentry.

6. A wireless device configured for operating in an idle mode for Machine To Machine (M2M) communication, comprising:
    a radio frequency unit for receiving and transmitting a radio signal; and
    a processor operatively coupled with the radio frequency unit and configured to:
    enter into an idle mode;
    receive, at the idle mode, a paging message from a base station, the paging message includes a M2M group identifier, a network access type, a resource offset and a monitoring duration,
        the M2M group identifier that identifies a M2M group to which the wireless device belongs,
        the network access type indicating a resource allocation for a ranging request,
        the resource offset indicating an offset that the wireless device starts to monitor an uplink resource assignment,
        the monitoring duration indicating a time duration that the wireless device monitors the uplink resource assignment; and
    monitor the uplink resource allocation beginning from the offset during the monitoring duration,
    wherein a cyclic redundancy check (CRC) of the uplink resource assignment is masked wit the 12 least significant bits of a fixed M2M deregristation identifier (FM-DID) to decode the uplink resource assignment, and
    wherein the 4 most significant bit bits of the FMDID are included in the uplink resource assignment.

7. The wireless device of claim 6, wherein the processor is configured to:
    instruct the radio frequency unit to transmit the ranging request to the base station by using the uplink resource assignment when the processor succeeds to receive the uplink resource assignment before an expiration of the monitoring duration.

8. The wireless device of claim 6, the processor is configured to:
    instruct the radio frequency unit to transmit a ranging code to the base station when the processor fails to receive the uplink resource assignment until an expiration of the time duration.

9. The wireless device of claim 6, wherein the paging message further includes an action code indicating that the wireless device performs a network reentry or a location update.

10. The wireless device of claim 6, wherein the FMDID is a 16-bit identifier that uniquely identifies the wireless device in domain of the base station, and wherein the FMDID is assigned to the wireless device by the base station during an idle mode entry and is released during a network reentry.

* * * * *